3,296,270
5,10-METHYLENE-19-NOR-PREGNANES AND THEIR PREPARATION
Lawrence H. Knox, Mexico City, Mexico, assignor to Syntex Corporation, Panama, Panama, a corporation of Panama
No Drawing. Filed Nov. 13, 1964, Ser. No. 411,130
16 Claims. (Cl. 260—397.3)

The present invention relates to certain novel cyclopentanophenanthrene derivatives and to the method for making the same.

More particularly, it relates to certain novel 5,10-methylene-19-nor-pregnan-derivatives substituted at C–3 by a lower alkyl radical or at C–1 and C–3 by lower alkyl, alkenyl or alkinyl radicals. These compounds are represented by the following formulas:

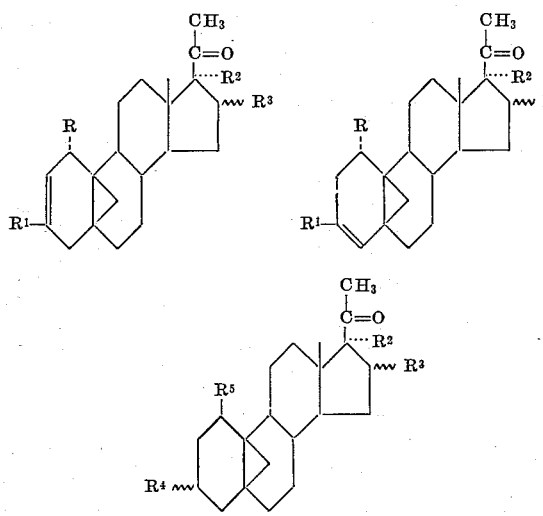

In the above formulas, R and $R^1$ represent lower alkyl, alkenyl or alkinyl radicals which may be the same or different, such as methyl, ethyl, propyl, vinyl, propenyl, ethinyl, propinyl, etc.; $R^2$ represents hydrogen, hydroxy or an acyloxy group of less than 12 carbon atoms; $R^3$ represents hydrogen, α-methyl or β-methyl; $R^4$ represents a lower alkyl group and $R^5$ represents hydrogen or a lower alkyl radical.

The acyloxy groups above referred to are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

These compounds are powerful progestational agents, useful in the treatment of menstrual disorders such as amenorrhea, dysmenorrhea, etc. and for maintenance of pregnancy and fertility control.

In addition they have anti-androgenic, anti-estrogenic and anti-gonadotrophic properties and lower the blood cholesterol level.

The method for producing the compounds of the present invention is illustrated by the following sequence of reactions:

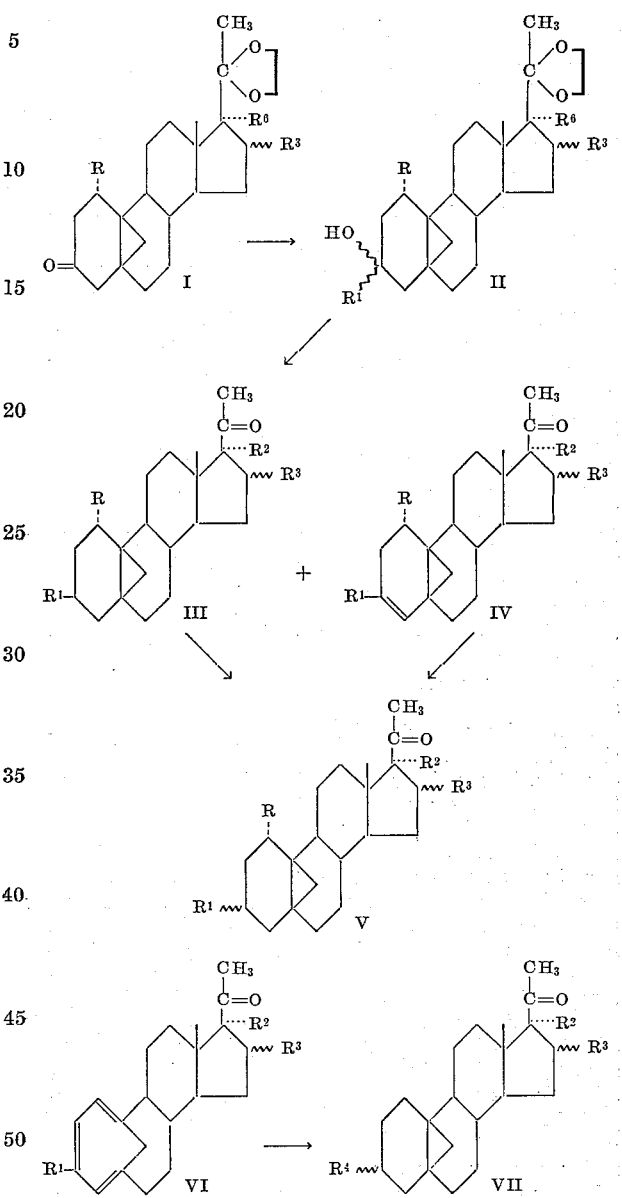

In the above formulas R, $R^1$, $R^2$ and $R^4$ have the same meaning as heretofore set forth and $R^6$ represents hydrogen or an acyloxy radical, preferably acetoxy.

In practicing the process illustrated above, there is employed as the starting compound a 1α-alkyl, alkenyl or alkinyl-20-ethylenedioxy-5,10 - methylene - 19 - nor-pregnan-3-one compound (I) which is obtained by treatment of $\Delta^5$ - pregnene - 3β,19-diol-20-one or the corresponding 16-methyl or 17α-acetoxy compounds with ethylene glycol in benzene solution and in the presence of p-toluenesulfonic acid, to produce the corresponding 20-ethylenedioxy derivatives, oxidation at C–3 under mild Oppenauer condition to $\Delta^4$-3-keto derivatives, reaction of these compounds with 2-chloro-1,1,2-trifluorotriethylamine in acetonitrile to produce a mixture of 20-ethylenedioxy-5,10-methylene - 19 - nor - Δ¹-pregnen-3-one compounds and 20 - ethylenedioxy-5,10-seco-5,19-cyclo - 10β - fluoro - Δ⁴ - pregnenes, and finally treatment of the 20 - ethylenedioxy - 5,10 - methylene-19-nor-Δ¹-pregnen-3-one compounds with a Grignard reagent, to produce a mixture of the 1α - substituted - 20 - ethylenedioxy - 5,10-methylene - 19 - nor - pregnan-3-one and the 3 - substituted - 5,10 - seco - 5,19-cyclo-Δ¹⁽¹⁰⁾,²,⁴-pregnatriene compounds, which is separated by chromatography, as described in my copending patent application Serial No. 346,074 filed February 20, 1964. The 1α-alkyl, alkenyl or alkinyl - 20 - ethylenedioxy - 5,10-methylene-19-nor-pregnen-3-one (I) is treated with a lower alkyl, alkenyl or alkinyl magnesium halide such as methyl magnesium bromide, ethyl magnesium bromide, vinylmagnesium bromide, ethinylmagnesium bromide, propargylmagnesium bromide, etc., in an inert organic solvent such as ether, benzene, tetrahydrofuran and the like, at a temperature comprised between room temperature and reflux, for a period of time of between 1 to 6 hours, to produce the corresponding 3-alkyl, alkenyl or alkinyl-3-hydroxy-20-ethylenedioxy - 5,10 - methylene - 19 - nor-pregnane compounds (II), which are then dehydrated preferably with 2-chloro-1,1,2-trifluorotriethylamine in an inert organic solvent such as tetrahydrofuran, methylene chloride, acetonitrile, etc. at room temperature for a prolonged period of time, or with thionyl chloride in pyridine solution, at a temperature below 0° C. and for a short period of time, in the order of 5 to 10 minutes, to produce a mixture of 1,3-dihydrocarbon substituted 20 - ethylenedioxy - 5,10 - methylene-19-nor-Δ²-pregnenes with the corresponding Δ³-isomers. Upon hydrolysis of the latter with p-toluenesulfonic acid in acetone solution, under conventional conditions give rise to a mixture of the corresponding 1,3 - disubstituted - 5,10 - methylene-19-nor-Δ²-pregnen-20-one (III; R²=H, acyloxy) and 1,3-disubstituted - 5,10 - methylene - 19 - nor - Δ³ - pregnen-20-one compounds (IV; R²=H, acyloxy), which are separated by chromatography on Florisil or neutral alumina.

Alternatively, the dehydration at C–3 and the hydrolysis of the ketal group at C–20 may be accomplished in one step, by reaction of the 1,3-disubstituted 3-hydroxy-20-ethylenedioxy compounds (II) with dry hydrogen chloride in acetic acid solution.

The 17α-acyloxy compounds (III and IV; R²=acyloxy) may be saponified with a dilute solution of potassium hydroxide in methanol, at reflux temperature, to the corresponding 17α-hydroxy compounds (III and IV; R²=OH) and reesterified conventionally with acid anhydrides of less than 12 carbon atoms in benzene solution and in the presence of p-toluenesulfonic acid.

Catalytic hydrogenation of III and IV in the presence of a heavy metal catalyst, preferably in the presence of a palladium on charcoal catalyst and using a lower aliphatic alcohol as solvent produces the saturated compounds, by absorption of 1 molar equivalent of hydrogen when R and R¹ are lower alkyl groups or from 2 to 5 molar equivalents when R and/or R¹ are alkenyl or alkinyl radicals. There are thus obtained the 1α,3α-dialkyl - 5,10 - methylene-19-nor-pregnanes, and 1α,3β-dialkyl - 5,10 - methylene-19-nor-pregnan derivatives (V), predominating the latter, which can be purified by fractional crystallization or chromatography. This hydrogenation is preferably conducted at room temperature and atmospheric pressure; these conditions are not critical.

In another aspect of the present invention, catalytic hydrogenation of the 3-alkyl, alkenyl or alkinyl derivatives of 5,10 - seco - 5,19 - cyclo - Δ¹⁽¹⁰⁾,²,⁴-pregnatrien-20-one compounds (VI), (obtained by acid hydrolysis of the corresponding 20-ethylenedioxy derivatives described in the aforementioned patent application) using essentially the same conditions as hereinbefore described for the 1,3-disubstituted derivatives, give rise to the 3α and 3β - alkyl - 5,10 - methylene 19-nor-pregnanes (VII), predominating the β-isomer, by absorption of 2 to 4 molar equivalents of hydrogen, depending on the substituent at C–3.

The following examples illustrate the invention but are not intended to limit its scope:

PREPARATION 1

A solution of 1 g. of 3-ethyl-20-ethylenedioxy-5,10-seco-5,19-cyclo-Δ¹⁽¹⁰⁾,²,⁴-pregnatriene in 30 cc. of acetone was treated, with 100 mg. of p-toluenesulfonic acid and the reaction mixture kept at room temperature for 4 hours. It was then poured into ice water, extracted with ethyl acetate and the organic extract washed with water to neutral, dried and evaporated to dryness. Addition of ether gave the pure 3-ethyl-5,10-seco-5,19-cyclo-Δ¹⁽¹⁰⁾,²,⁴-pregnatrien-20-one.

In a similar manner, the compounds mentioned below under I were converted into the products listed under II:

| I | II |
|---|---|
| 3-ethinyl-20-ethylenedioxy-5,10-seco-5,19-cyclo-Δ¹⁽¹⁰⁾,²,⁴-pregnatriene. | 3-ethinyl-5,10-seco-5,19-cyclo-Δ¹⁽¹⁰⁾,²,⁴-pregnatrien-20-one. |
| 3,16α-dimethyl-20-ethylenedioxy-5,10-seco-5,19-cyclo-Δ¹⁽¹⁰⁾,²,⁴-pregnatriene. | 3,16α-dimethyl-5,10-seco-5,19-cyclo-Δ¹⁽¹⁰⁾,²,⁴-pregnatrien-20-one. |
| 3-ethyl-16β-methyl-20-ethylenedioxy-5,10-seco-5,19-cyclo-Δ¹⁽¹⁰⁾,²,⁴-pregnatriene. | 3-ethyl-16β-methyl-5,10-seco-5,19-cyclo-Δ¹⁽¹⁰⁾,²,⁴-pregnatrien-20-one. |
| 3-ethinyl-16α-methyl-20-ethylenedioxy-5,10-seco-5,19-cyclo-Δ¹⁽¹⁰⁾,²,⁴-pregnatriene. | 3-ethinyl-16α-methyl-5,10-seco-5,19-cyclo-Δ¹⁽¹⁰⁾,²,⁴-pregnatrien-20-one. |
| 3-vinyl-16β-methyl-20-ethylenedioxy-5,10-seco-5,19-cyclo-Δ¹⁽¹⁰⁾,²,⁴-pregnatriene. | 3-vinyl-16β-methyl-5,10-seco-5,19-cyclo-Δ¹⁽¹⁰⁾,²,⁴-pregnatrien-20-one. |
| The acetate of 3,16α-dimethyl-20-ethylenedioxy-5,10-seco-5,19-cyclo-Δ¹⁽¹⁰⁾,²,⁴-pregnatrien-17α-ol. | The acetate of 3,16α-dimethyl-5,10-seco-5,19-cyclo-Δ¹⁽¹⁰⁾,²,⁴-pregnatrien-17α-ol-20-one. |
| The acetate of 3-vinyl-16α-methyl-20-ethylenedioxy-5,10-seco-5,19-cyclo-Δ¹⁽¹⁰⁾,²,⁴-pregnatrien-17α-ol. | The acetate of 3-vinyl-16α-methyl-5,10-seco-5,19-cyclo-Δ¹⁽¹⁰⁾,²,⁴-pregnatrien-17α-ol-20-one. |
| The acetate of 3-propyl-20-ethylenedioxy-5,10-seco-5,19-cyclo-Δ¹⁽¹⁰⁾,²,⁴-pregnatrien-17α-ol. | The acetate of 3-propyl-5,10-seco-5,19-cyclo-Δ¹⁽¹⁰⁾,²,⁴-pregnatrien-17α-ol-20-one. |
| The acetate of 3-vinyl-20-ethylenedioxy-5,10-seco-5,19-cyclo-Δ¹⁽¹⁰⁾,²,⁴-pregnatrien-18α-ol. | The acetate of 3-vinyl-5,10-seco-5,19-cyclo-Δ¹⁽¹⁰⁾,²,⁴-pregnatrien-17α-ol-20-one. |

Example I

A solution of 2.5 g. of 1α-methyl-20-ethylenedioxy-5,10-methylene-19-nor-pregnan-3-one, obtained as described in my copending application Serial No. 346,074, filed February 20, 1964, in 100 cc. of ether was added dropwise, over a 15 minute period, to 25 cc. of 4-N-methylmagnesium bromide solution in ether, under stirring, and the reaction mixture was stirred at room temperature under anhydrous conditions for 4 hours further. After this time it was treated carefully with saturated sodium sulfate solution and solid sodium sulfate, the inorganic material was filtered off and washed well with ether, and the filtrate evaporated to dryness. The residue was crystallized from acetone-hexane, thus affording 1α,3-dimethyl - 20-ethylenedioxy - 5,10-methylene-19-nor-pregnan-3-ol.

Example II

A solution of 1 g. of 1α,3-dimethyl-20-ethylenedioxy-5,10-methylene-19-nor-pregnan-3-ol in 7 cc. of dry pyridine was cooled to −10° C., treated with 0.4 cc. of thionyl chloride and the mixture allowed to stand for 10 minutes at this temperature. Ice-water was added and the product extracted with methylene chloride. The organic extract was washed with water, hydrochloric acid solution, sodium bicarbonate solution and water to neutral, dried over anhydrous sodium sulfate and evaporated to dryness under reduced pressure. The residue, consisting of a mixture of 1α,3-dimethyl-20-ethylenedioxy-5,10-methylene-19-nor-Δ²-pregnene, and 1α,3-dimethyl-20-ethylenedioxy-5,10-methylene-19-nor-Δ³-pregnene was dissolved in 60 cc. of acetone and treated with 100 mg. of p-toluenesulfonic acid, and the reaction mixture was kept at room temperature overnight. It was then poured into ice water, extracted with ethyl acetate and the organic extract washed with water to neutral, dried and evaporated to dryness. The residue was chromatographed on 50 g. of neutral alumina, thus producing 1α,3-dimethyl-5,10-methylene-19-nor-Δ²-pregnen-20-one and 1α,3-dimethyl-5,10-methylene-19-nor-Δ³-pregnen-20-one in pure form.

*Example III*

To a solution of 1 g. of 1α,3-dimethyl-20-ethylenedioxy-5,10-methylene-19-nor-pregnan-3-ol in 20 cc. of anhydrous tetrahydrofuran there were added 1.5 molar equivalents of 2-chloro-1,1,2-trifluorotriethylamine and the reaction mixture was kept at room temperature overnight. It was then evaporated to dryness under reduced pressure and the oily residue treated with p-toluenesulfonic acid in acetone solution, as described in Example II, to produce, after chromatography on neutral alumina, 1α,3-dimethyl-5,10-methylene-19-nor-Δ²-pregnen - 20 - one and 1α,3-dimethyl-5,10-methylene-19-nor-Δ³-pregnen-20-one, identical to those obtained in the preceding example.

*Example IV*

Into a suspension of 1 g. of 1α,3-dimethyl-20-ethylenedioxy-5,10-methylene-19-nor-pregnan-3-ol in 35 cc. of glacial acetic acid, there was passed a slow stream of dry hydrochloric acid; after 10 minutes all the solid material was dissolved. The gas was passed through the reaction mixture for a total of 5 hours. The solution was concentrated to about one third its initial volume by distillation under reduced pressure at 35° C., then it was poured into ice-water. The product was extracted with ether, washed Upon treatment of these compounds with hydrogen chloride in acetic acid, in accordance with the method of Example IV there were produced respectively, 1α-ethyl-3-methyl-5,10-methylene-19-nor-Δ²-pregnen-20-one and 1α-ethyl-3-methyl-5,10-methylene-19-nor-Δ³-pregnen-20-one;

1α-vinyl-3-methyl-5,10-methylene-19-nor-Δ²-pregnen-20-one and

1α-vinyl-3-methyl-5,10-methylene-19-nor-Δ³-pregnen-20-one and

1α-ethinyl-3-methyl-5,10-methylene-19-nor-Δ²-pregnen-20-one and

1α-ethinyl-3-methyl-5,10-methylene-19-nor-Δ³-pregnen-20-one.

*Example VI*

A solution of 5 g. of 1α,16α-dimethyl-20-ethylenedioxy-5,10-methylene-19-nor-pregnan-3-one in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 1α,3,16α - trimethyl-20-ethylenedioxy-5,10-methylene-19-nor-pregnan-3-ol.

In a similar manner, the compounds mentioned below under I were treated with the indicated Grignard reagent, to produce the compounds listed under II.

| I | Reagent | II |
| --- | --- | --- |
| 1α-methyl-20-ethylene-dioxy-5,10-methylene-19-nor-pregnan-3-one. | Vinylmagnesium bromide | 1α-methyl-3-vinyl-20-ethylenedioxy-5,10-methylene-19-nor-pregnan-3-ol. |
| 1α-vinyl-20-ethylenedioxy-5,10-methylene-19-nor-pregnan-3-one. | Ethylmagnesium bromide | 1α-vinyl-3-ethyl-20-ethylenedioxy-5,10-methylene-19-nor-pregnan-3-ol. |
| 1α-ethyl-20-ethylenedioxy-5,10-methylene-19-nor-pregnan-3-one. | Propylmagnesium bromide | 1α-ethyl-3-propyl-20-ethylenedioxy-5,10-methylene-19-nor-pregnan-3-ol. |
| 1α,16α-dimethyl-20-ethylenedioxy-5,10-methylene-19-nor-pregnan-3-one. | Ethinylmagnesium bromide | 1α,16α-dimethyl-3-ethinyl-20-ethylenedioxy-5,10-methylene-19-nor-pregnan-3-ol. |
| 1α-ethinyl-16α-methyl-20-ethylenedioxy-5,10-methylene-19-nor-pregnan-3-one. | Methylmagnesium bromide | 1α-ethinyl-3,16α-dimethyl-20-ethylenedioxy-5,10-methylene-19-nor-pregnan-3-ol. |
| 1α-ethyl-16β-methyl-20-ethylenedioxy-5,10-methylene-19-nor-pregnan-3-one. | Propylmagnesium bromide | 1α-ethyl-3-propyl-16β-methyl-20-ethylenedioxy-5,10-methylene-19-nor-pregnan-3-ol. |
| 1α-vinyl-16β-methyl-20-ethylenedioxy-5,10-methylene-19-nor-pregnan-3-one. | Vinylmagnesium bromide | 1α,3-divinyl-16β-methyl-20-ethylenedioxy-5,10-methylene-19-nor-pregnan-3-ol. |
| The acetate of 1α,16α-dimethyl-20-ethylenedioxy-5,10-methylene-19-nor-pregnan-17α-ol-3-one. | Ethinylmagnesium bromide | The acetate of 1α,16α-dimethyl-3-ethinyl-20-ethylenedioxy-5,10-methylene-19-nor-pregnane-3,17α-diol. |
| The acetate of 1α-vinyl-16α-methyl-20-ethylenedioxy-5,10-methylene-19-nor-pregnan-17α-ol-3-one. | Methylmagnesium bromide | The acetate of 1α-vinyl-3,16α-dimethyl-20-ethylenedioxy-5,10-methylene-19-nor-pregnane-3,17α-diol. |
| The acetate of 1α-propyl-20-ethylenedioxy-5,10-methylene-19-nor-pregnan-17α-ol-3-one. | Propylmagnesium bromide | The acetate of 1α,3-dipropyl-20-ethylenedioxy-5,10-methylene-19-nor-pregnane-3,17α-diol. |
| The acetate of 1α-vinyl-20-ethylenedioxy-5,10-methylene-19-nor-pregnan-17α-ol-3-one. | Ethylmagnesium bromide | The acetate of 1α-vinyl-3-ethyl-20-ethylenedioxy-5,10-methylene-19-nor-pregnane-3,17α-diol. |
| The acetate of 1α-propinyl-20-ethylenedioxy-5,10-methylene-19-nor-pregnan-17α-ol-3-one. | Methylmagnesium bromide | The acetate of 1α-propinyl-3-methyl-20-ethylenedioxy-5,10-methylene-19-nor-pregnane-3,17α-diol. |
| The acetate of 1α,16α-dimethyl-20-ethylenedioxy-5,10-methylene-19-nor-pregnan-17α-ol-3-one. | Methylmagnesium bromide | The acetate of 1α,3,16α-trimethyl-20-ethylenedioxy-5,10-methylene-19-nor-pregnane-3,17α-diol. | to neutral, dried and evaporated to dryness. Chromatography of the residue on 50 g. of Florisil afforded 1α,3-dimethyl-5,10-methylene-19-nor-Δ²-pregnen-20-one and 1α,3-dimethyl-5,10 - methylene-19-nor-Δ³-pregnen-20-one in pure form, identical to the products obtained by the method of Example II.

*Example V*

By following the method of Example I, 1α-ethyl-20-ethylenedioxy-5,10 - methylene-19-nor-pregnan-3-one, 1α-vinyl-20-ethylenedioxy - 5,10 - methylene-19-nor-pregnan-3-one and 1α-ethinyl-20-ethylenedioxy-5,10-methylene-19-nor-pregnan-3-one, obtained as described in the aforementioned copending application were converted respectively into 1α-ethyl-3-methyl-20-ethylenedioxy-5,10-methylene-19-nor-pregnan-3-ol, 1α-vinyl-3-methyl-20-ethylenedioxy-5,10 - methylene - 19 - nor-pregnan-3-ol and 1α-ethinyl-3-methyl-20-ethylenedioxy-5,10-methylene-19-nor - pregnan-3-ol.

*Example VII*

By following the method of Example III, the compounds obtained in the preceding example were dehydrated with 2-chloro-1,1,2-trifluorotriethylamine, hydrolized with p-toluenesulfonic acid in acetone and chromatographed on Florisil, to produce, respectively:

1α,3,16α-trimethyl-5,10-methylene-19-nor-Δ²-pregnen-20-one and 1α,3,16α-trimethyl-5,10-methylene-19-nor-Δ³-pregnen-20-one;

1α-methyl-3-vinyl-5,10-methylene-19-nor-Δ²-pregnen-20-one and 1α-methyl-3-vinyl-5,10-methylene-19-nor-Δ³-pregnen-20-one;

1α-vinyl-3-ethyl-5,10-methylene-19-nor-Δ²-pregnen-20-one and 1α-vinyl-3-ethyl-5,10-methylene-19-nor-Δ³-pregnen-20-one;

1α-ethyl-3-propyl-5,10-methylene-19-nor-Δ²-pregnen-20-one and 1α-ethyl-3-propyl-5,10-methylene-19-nor-Δ³-pregnen-20-one;

1α,16α-dimethyl-3-ethinyl-5,10-methylene-19-nor-Δ²-pregnen-20-one and 1α,16α-dimethyl-3-ethinyl-5,10-methylene-19-nor-Δ³-pregnen-20-one;

1α-ethinyl-3,16α-dimethyl-5,10-methylene-19-nor-Δ²-pregnen-20-one and 1α-ethinyl-3,16α-dimethyl-5,10-methylene-19-nor-Δ³-pregnen-20-one;

1α-ethyl-3-propyl-16β-methyl-5,10-methylene-19-nor-Δ²-pregnen-20-one and 1α-ethyl-3-propyl-16β-methyl-5,10-methylene-19-nor-Δ³-pregnen-20-one;

1α,3-divinyl-16β-methyl-5,10-methylene-19-nor-Δ²-pregnen-20-one and 1α,3-divinyl-16β-methyl-5,10-methylene-19-nor-Δ³-pregnen-20-one;

the acetate of 1α,16α-dimethyl-3-ethinyl-5,10-methylene-19-nor-Δ²-pregnen-17α-ol-20-one and the acetate of 1α,16α-dimethyl-3-ethinyl-5,10-methylene-19-nor-Δ³-pregnen-17α-ol-20-one;

the acetate of 1α-vinyl-3,16α-dimethyl-5,10-methylene-19-nor-Δ²-pregnen-17α-ol-20-one and the acetate of 1α-vinyl-3,16α-dimethyl-5,10-methylene-19-nor-Δ³-pregnen-17α-ol-20-one;

the acetate of 1α,3-dipropyl-5,10-methylene-19-nor-Δ²-pregnen-17α-ol-20-one and the acetate of 1α,3-dipropyl-5,10-methylene-19-nor-Δ³-pregnen-17α-ol-20-one;

the acetate of 1α-vinyl-3-ethyl-5,10-methylene-19-nor-Δ²-pregnen-17α-ol-20-one and the acetate of 1α-vinyl-3-ethyl-5,10-methylene-19-nor-Δ³-pregnen-17α-ol-20-one;

the acetate of 1α-propinyl-3-methyl-5,10-methylene-19-nor-Δ²-pregnen-17α-ol-20-one and the acetate of 1α-propinyl-3-methyl-5,10-methylene-19-nor-Δ³-pregnen-17α-ol-20-one;

the acetate of 1α,3,16α-trimethyl-5,10-methylene-19-nor-Δ²-pregnen-17α-ol-20-one and the acetate of 1α,3,16α-trimethyl-5,10-methylene-19-nor-Δ³-pregnen-17α-ol-20-one.

*Example VIII*

A solution of 1 g. of 1α,3-dimethyl-5,10-methylene-19-nor-Δ²-pregnen-20-one in 100 cc. of methanol was hydrogenated in the presence of 100 mg. of previously reduced 5% palladium charcoal catalyst, until the absorption of hydrogen ceased (1 molar equivalent). The catalyst was filtered off and the filtrate evaporated to dryness. Crystallization of the residue from acetone-ether gave the pure 1α,3β-dimethyl-5,10-methylene-19-nor-pregnan-20-one.

The same product was obtained when 1α,3-dimethyl-5,10-methylene-19-nor-Δ³-pregnen-20-one was used as starting material.

*Example IX*

In accordance with the hydrogenation method described in the preceding example,

1α,3,16α-trimethyl-5,10-methylene-19-nor-Δ²-pregnen-20-one,

1α-ethyl-3-methyl-5,10-methylene-19-nor-Δ²-pregnen-20-one,

1α-ethyl-3-propyl-16β-methyl-5,10-methylene-19-nor-Δ³-pregnen-20-one, and the acetate of 1α,3-dipropyl-5,10-methylene-19-nor-Δ³-pregnen-17α-ol-20-one were converted into the corresponding saturated derivatives, namely 1α,3β,16α-trimethyl-5,10-methylene-19-nor-pregnan-20-one, 1α-ethyl-3β-methyl-5,10-methylene-19-nor-pregnan-20-one, 1α-ethyl-3β-propyl-16β-methyl-5,10-methylene-19-nor-pregnan-20-one and the acetate of 1α,3β-dipropyl-5,10-methylene-19-nor-pregnan-17α-ol-20-one.

*Example X*

A solution of 2 g. of 1α-ethinyl-3-methyl-5,10-methylene-19-nor-Δ³ - pregnen-20-one in 250 cc. of ethanol was hydrogenated in the presence of 400 mg. of previously reduced 10% palladium charcoal catalyst, until the absorption of hydrogen ceased (3 molar equivalents). The catalyst was removed by filtration and the filtrate evaporated to dryness under reduced pressure. The residue was crystallized from acetone-hexane, thus affording 1α-ethyl-3β-methyl-5,10-methylene-19 - nor - pregnan-20-one, identical to the obtained in the preceding example.

Similarly, the compounds mentioned below under I were converted into the corresponding saturated derivatives listed under II:

| I | II |
|---|---|
| 1α-ethinyl-3,16α-dimethyl-5,10-methylene-19-nor-Δ²-pregnen-20-one. | 1α-ethyl-3β-16α-dimethyl-5,10-methylene-19-nor-pregnan-20-one. |
| 1α,3-divinyl-16β-methyl-5,10-methylene-19-nor-Δ³-pregnen-20-one. | 1α,3β-diethyl-16β-methyl-5,10-methylene-19-nor-pregnan-20-one. |
| the acetate of 1α,16α-dimethyl-3-ethinyl-5,10-methylene-19-nor-Δ²-pregnen-17α-ol-20-one. | the acetate of 1α,16α-dimethyl-3β-ethyl-5,10-methylene-19-nor-pregnan-17α-ol-20-one. |
| the acetate of 1α-propinyl-3-methyl-5,10-methylene-19-nor-Δ³-pregnen-17α-ol-20-one. | the acetate of 1α-propyl-3β-methyl-5,10-methylene-19-nor-pregnan-17α-ol-20-one. |

*Example XI*

In the method of the preceding example there was used 1α-vinyl-3-methyl-5,10-methylene-19 - nor - Δ³-pregnen-20-one as starting material and the uptake of hydrogen was of 2 molar equivalents, thus producing 1α-ethyl-3-β-methyl-5,10-methylene-19-nor-pregnan - 20-one, identical to the obtained in Examples IX and X.

*Example XII*

A solution of 1 g. of the acetate of 1α,3,16α-trimethyl-5,10-methylene - 19 - nor-Δ³-pregnen-17α-ol-20-one in 50 cc. of methanol was refluxed for 3 hours with 500 mg. of potassium hydroxide dissolved in 1 cc. of water; it was then poured into ice water, the precipitate collected, washed with water to neutral and dried, thus producing a crude compound which upon recrystallization from methylene-chloride-ether afforded 1α,3,16α - trimethyl - 5,10-methylene-19-nor-Δ³-pregnen-17α-ol-20-one.

By the same method, the acetate of

1α,16α-dimethyl-3-ethinyl-5,10-methylene-19-nor-Δ²-pregnen-17α-ol-20-one, the acetate of 1α-vinyl-3,16α-dimethyl-5,10-methylene-19-nor-Δ²-pregnen-17α-ol-20-one, the acetate of 1α,3-dipropyl-5,10-methylene-19-nor-Δ³-pregnen-17α-ol-20-one, the acetate of 1α-propinyl-3-methyl-5,10-methylene-19-nor-Δ³-pregnen-17α-ol-20-one, the acetate of 1α,16α-dimethyl-3β-ethyl-5,10-methylene-19-nor-pregnan-17α-ol-20-one and the acetate of 1α-propyl-3β-methyl-5,10-methylene-19-nor-pregnan-17α-ol-20-one were converted into the corresponding free compounds.

*Example XIII*

To a solution of 500 mg. of 1α,16α-dimethyl-3β-ethyl-5,10-methylene-19-nor-pregnan-17α-ol-20-one in 10 cc. of anhydrous benzene there were added 100 mg. of p-toluene sulfonic acid and 1.5 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the caproate of 1α,16α-dimethyl-3β-ethyl-5,10-methylene-19-nor-pregnan-17α-ol-20-one.

By the same method,

1α,16α-dimethyl-3-ethinyl-5,10-methylene-19-nor-Δ²-pregnen-17α-ol-20-one,
1α-vinyl-3,16α-dimethyl-5,10-methylene-19-nor-Δ²-pregnen-17α-ol-20-one,
1α,3-dipropyl-5,10-methylene-19-nor-Δ³-pregnen-17α-ol-20-one,
1α-propinyl-3-methyl-5,10-methylene-19-nor-Δ³-pregnen-17α-ol-20-one and
1α-propyl-3β-methyl-5,10-methylene-19-nor-pregnan-17α-ol-20-one were esterified with propionic, caproic and cyclopentylpropionic anhydrides to produce the respective propionates, caproates and cyclopentylpropionates.

Example XIV

A solution of 1 g. of 3-methyl-5,10-seco-5,19-cyclo-Δ¹⁽¹⁰⁾,²,⁴-pregnatrien-20-one in 50 cc. of ethanol was added to a suspension of 250 mg. of a 10% palladium on charcoal catalyst, previously reduced. The mixture was hydrogenated at room temperature, at atmospheric pressure, until the absorption of hydrogen ceased (approximately 2 molar equivalents of hydrogen were absorbed). The catalyst was removed by filtration, and the solvent evaporated under reduced pressure, water was added to the residue and the product was extracted with methylene chloride. The extract was washed with water, dried over anhydrous sodium sulfate and evaporated to dryness under vacuum. Crystallization from acetone-hexane afforded 3β-methyl-5,10-methylene-19-nor-pregnan-20-one.

By the same method, the compounds mentioned below under I were converted into the saturated compounds listed under II:

| I | II |
|---|---|
| 3-ethyl-5,10-seco-5,19-cyclo-Δ¹⁽¹⁰⁾,²,⁴-pregnatrien-20-one. | 3β-ethyl-5,10-methylene-19-nor-pregnan-20-one. |
| 3,16α-dimethyl-5,10-seco-5,19-cyclo-Δ¹⁽¹⁰⁾,²,⁴-pregnatrien-20-one. | 3β,16α-dimethyl-5,10-methylene-19-nor-pregnan-20-one. |
| 3-ethyl-16β-methyl-5,10-seco-5,19-cyclo-Δ¹⁽¹⁰⁾,²,⁴-pregnatrien-20-one. | 3β-ethyl-16β-methyl-5,10-methylene-19-nor-pregnan-20-one. |
| The acetate of 3,16α-dimethyl-5,10-seco-5,19-cyclo-Δ¹⁽¹⁰⁾,²,⁴-pregnatrien-17α-ol-20-one. | The acetate of 3β,16α-dimethyl-5,10-methylene-19-nor-pregnan-17α-ol-20-one. |
| The acetate of 3-propyl-5,10-seco-5,19-cyclo-Δ¹⁽¹⁰⁾,²,⁴-pregnatrien-17α-ol-20-one. | The acetate of 3β-propyl-5,10-methylene-19-nor-pregnan-17α-ol-20-one. |

Example XV

A solution of 1 g. of 3-ethinyl-5,10-seco-5,19-cyclo-Δ¹⁽¹⁰⁾,²,⁴-pregnatrien-20-one in 150 cc. of ethanol was hydrogenated at room temperature and atmospheric pressure, in the presence of 400 mg. of 10% palladium-charcoal catalyst, which had been previously reduced, until the absorption of hydrogen ceased (approximately 4 molar equivalents). The catalyst was eliminated by filtration and the filtrate evaporated to dryness. The solid residue was crystallized from acetone-hexane, to produce 3β-ethyl-5,10-methylene-19-nor-pregnan-20-one, identical to the obtained in the preceding example.

In a similar manner, 3-ethinyl-16α-methyl-5,10-seco-5,19-cyclo-Δ¹⁽¹⁰⁾,²,⁴-pregnatrien-20-one was converted into 3β-ethyl-16α-methyl-5,10-methylene-19-nor-pregnan-20-one.

Example XVI

Example XV was repeated but using 3-vinyl-16β-methyl-5,10-seco-5,19-cyclo-Δ¹⁽¹⁰⁾,²,⁴-pregnatrien-20-one, and the uptake of hydrogen was of 3 molar equivalents only. There was thus obtained 3β-ethyl-16β-methyl-5,10-methylene-19-nor-pregnan-20-one, identical to that obtained in Example XIV.

Similarly, the acetate of 3-vinyl-5,10-seco-5,19-cyclo-Δ¹⁽¹⁰⁾,²,⁴-pregnatrien-17α-ol-20-one and the acetate of 3-vinyl-16α-methyl-5,10-seco-5,19-cyclo-Δ¹⁽¹⁰⁾,²,⁴-pregnatrien-17α-ol-20-one were converted respectively into the acetate of 3β-ethyl-5,10-methylene-19-nor-pregnan-17α-ol-20-one and the acetate of 3β-ethyl-16α-methyl-5,10-methylene-19-nor-pregnan-17α-ol-20-one.

Example XVII

In accordance with the method of Example XII, the acetate of

3β-propyl-5,10-methylene-19-nor-pregnan-17α-ol-20-one,
the acetate of 3β,16α-dimethyl-5,10-methylene-19-nor-pregnan-17α-ol-20-one and
the acetate of 3β-ethyl-16α-methyl-5,10-methylene-19-nor-pregnan-17α-ol-20-one were converted into the corresponding free compounds, namely,
3β-propyl-5,10-methylene-19-nor-pregnan-17α-ol-20-one,
3β,16α-dimethyl-5,10-methylene-19-nor-pregnan-17α-ol-20-one and
3β-ethyl-16α-methyl-5,10-methylene-19-nor-pregnan-17α-ol-20-one.

Upon reesterification of these 17α-hydroxy compounds with propionic, caproic and undecenoic anhydrides, in accordance with the method of Example XIII, there were produced the corresponding propionates, caproates and undecenoates.

I claim:
1. A compound of the following formula:

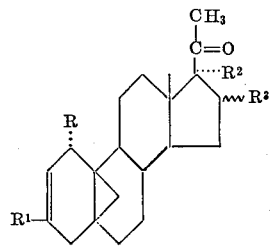

wherein R and R¹ are selected from the group consisting of lower alkyl, lower alkenyl and lower alkinyl; R² is selected from the group consisting of hydrogen, hydroxy and an acyloxy group of less than 12 carbon atoms and R³ is selected from the group consisting of hydrogen, α-methyl and β-methyl.

2. 1α,3 - dimethyl - 5,10 - methylene - 19 - nor - Δ²-pregnen-20-one.

3. 1α,3,16α - trimethyl - 5,10 - methylene - 19 - nor-Δ²-pregnen-20-one.

4. 1α - ethyl - 3 - methyl - 5,10 - methylene - 19 - nor-Δ²-pregnen-20-one.

5. 1α,16α - dimethyl - 3 - ethinyl - 5,10 - methylene-19-nor-Δ²-pregnen-17α-ol-20-one.

6. The acetate of 1α-vinyl-3-ethyl-5,10-methylene-19-nor-Δ²-pregnen-17α-ol.

7. A compound of the following formula:

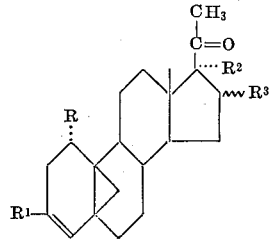

wherein R and R¹ are selected from the group consisting of lower alkyl, lower alkenyl and lower alkinyl; R² is selected from the group consisting of hydrogen, hydroxy and an acyloxy group of less than 12 carbon atoms and R³ is selected from the group consisting of hydrogen, α-methyl and β-methyl.

8. 1α,3 - dimethyl - 5,10 - methylene - 19 - nor - Δ³-pregnen-20-one.

9. 1α,3,16α - trimethyl - 5,10 - methylene - 19 - nor-Δ³-pregnen-20-one.

10. 1α - vinyl - 3 - methyl - 5,10 - methylene - 19-nor-Δ³-pregnen-20-one.

11. The acetate of 1α-vinyl-3-ethyl-5,10-methylene-19-nor-Δ³-pregnen-17α-ol-20-one.

12. 1α,3,16α - trimethyl - 5,10 - methylene - 19 - nor-Δ³-pregnen-17α-ol-20-one.

13. A compound of the following formula:

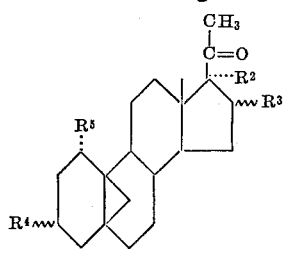

wherein $R^2$ is selected from the group consisting of hydrogen, hydroxy and an acyloxy group of less than 12 carbon atoms; $R^3$ is selected from the group consisting of hydrogen, α-methyl and β-methyl; $R^4$ represents a lower alkyl radical and $R^5$ represents a lower alkyl group.

14. 1α,3β - dimethyl - 5,10 - methylene - 19 - nor-pregnan-20-one.

15. 1α - ethyl - 3β - methyl - 5,10 - methylene - 19-nor-pregnan-20-one.

16. The acetate of 1α,16α-dimethyl-3β-ethyl-5,10-methylene-19-nor-pregnan-17α-ol-20-one.

References Cited by the Examiner
UNITED STATES PATENTS
3,185,714  5/1965  Knox _____ 260—397.3

LEWIS GOTTS, *Primary Examiner.*

H. A. FRENCH, *Assistant Examiner.*